May 19, 1953 R. SHERR 2,639,423
RADAR CONTRAST CONTROL SYSTEM
Filed Aug. 1, 1945 3 Sheets-Sheet 1
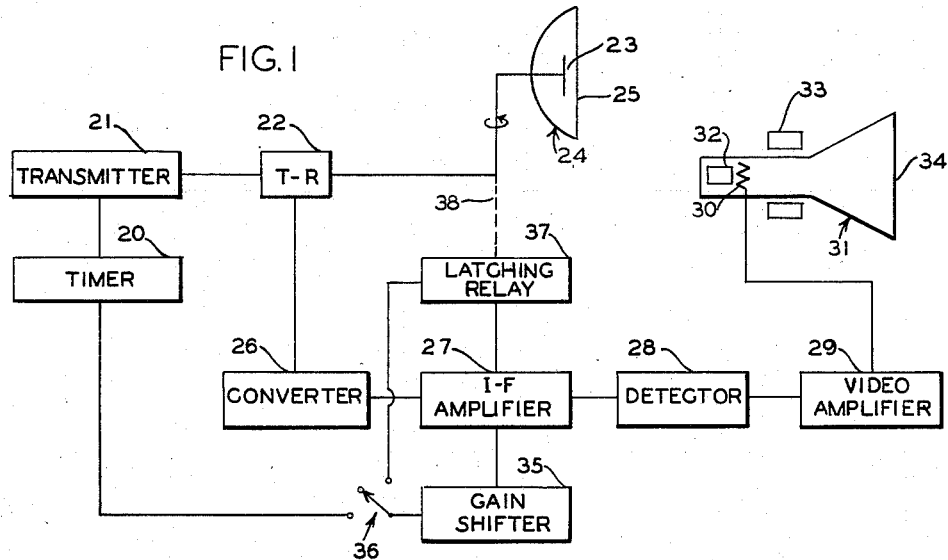
INVENTOR
RUBBY SHERR
BY
William D. Hall
ATTORNEY May 19, 1953 R. SHERR 2,639,423
RADAR CONTRAST CONTROL SYSTEM
Filed Aug. 1, 1945 3 Sheets-Sheet 3

INVENTOR
RUBBY SHERR
BY *William D. Hall*
ATTORNEY

Patented May 19, 1953

2,639,423

UNITED STATES PATENT OFFICE 2,639,423

RADAR CONTRAST CONTROL SYSTEM

Rubby Sherr, Santa Fe, N. Mex., assignor, by mesne assignments, to the United States of America as represented by the Secretary of War Application August 1, 1945, Serial No. 608,306

4 Claims. (Cl. 343—11)

This invention relates generally to an electrical circuit and more specifically to a method for improving the contrast in the image presentation of a radio object detection system.

In one type of radio object detection system, pulses of radio frequency energy are radiated from an antenna in a directional beam. The number of pulses per second is called the pulse repetition frequency (PRF) of the system. Certain objects interfere with said beam and reflect radio energy in the form of echo pulses back to the apparatus where it is detected and amplified in the receiving channel and presented for display upon a cathode ray tube. A display means presents the reflected radio energy signals as intensified traces on the screen of the cathode ray tube.

In one type of display, known as plan position indication (PPI), an electron beam sweeps radially outward from the center of the cathode ray tube screen towards the periphery. Each sweep is instigated simultaneously with the leading edge of a pulse transmitted by the radio object detection equipment. This radial sweep is caused to rotate about the center of the cathode ray tube screen in synchronism with the azimuthal rotation of the antenna.

A returning echo pulse intensity modulates the electron beam and causes an intensified indication of a reflecting object to appear on the display screen of the cathode ray tube. Reflecting objects are thus indicated as traces with polar coordinates of azimuth and range.

Targets indicated by PPI type presentation generally fall within three classes:

(1) Bodies of water, the reflected echo signals of which are of quite low intensity;

(2) Land areas, the reflected echo signals of which are of higher intensity than those in Class 1, but which are also of moderately low intensity;

(3) Large objects having good reflecting characteristics such as buildings or bridges whose high intensity reflected echo signals may be some 30 or 40 times the gain of those of Class 2.

The useful range of the cathode ray tube lies between a lower threshold below which signals will not cause visible indication and an upper blooming level above which echo signal traces will not become more intense but will merely be defocused and blurred on the display screen.

The useful range of the cathode ray tube in common use is so limited that it will not allow the true relative presentation of all of the reflected echo signals mentioned above whose relative intensities differ so widely. In other words, when the gain of the receiver channel is reduced sufficiently to prevent the high intensity signals from defocusing or blurring the display screen, it may be so low as to exclude entirely the lower intensity signals. With the lower level signals excluded, general land and water contours disappear and it is often difficult to identify the high intensity signals.

The receiver channel of the radio object detection equipment has a video limit level which may or may not be adjusted to limit its maximum output to a value below the blooming level of the display tube.

Since the display means has a limited range and since the intensity ratio of the strong and weak signals is high and constantly changing, it is most difficult to achieve satisfactory contrast between the signal traces on display by manual manipulation of the system gain control.

One object of this invention is to improve the contrast between displayed echo traces from various kinds of objects. Another object is to improve the control of contrast between the displayed echo traces of the various kinds of objects. Another object is to provide a means for shifting the gain of an electronic circuit. A further object is to provide a means for shifting the limit level of an electronic circuit.

Other objects, features and advantages of this invention will suggest themselves to those skilled in the art and will become apparent from the following description of the invention taken in connection with the accompanying drawings, in which:

Fig. 1 is a block diagram of a system embodying the principles of this invention;

Fig. 2 illustrates a typical display on a cathode ray tube of the system shown in Fig. 1;

Fig. 3 is a schematic diagram of portions of the components shown in Fig. 1;

Figure 4:
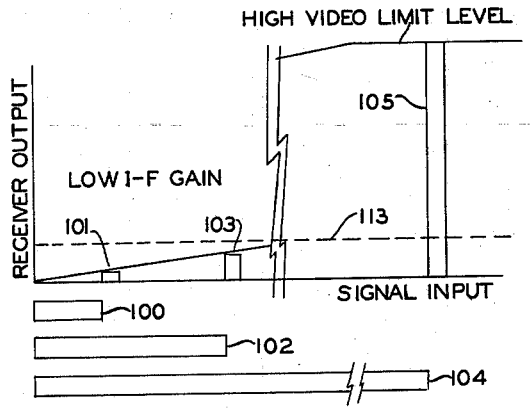
Figs. 4 to 6 are graphs of receiver characteristics used in the explanation of the embodiment shown in Fig. 1.

Referring now more particularly to Fig. 1, timer 20 controls the pulse repetition frequency of radio frequency transmitter 21. Pulses from transmitter 21 are fed through T-R box 22 to radiating element 23 of antenna 24 which also includes reflector 25. Reflector 25 along with radiating element 23 rotates about a substantially vertical axis in an azimuthal sweep cycle. Dipole 23 is connected through T-R box 22, converter 26, amplifier 27, detector 28, and video amplifier 29 to control grid 30 of cathode ray tube 31. Cathode ray tube 31 also includes electron gun 32, deflecting means 33 and indicating screen 34.

Gain shifting circuit 35 is connected to I.-F. amplifier 27 so as to control the gain of the latter. Gain shifter 35 is connected through switch 36 to latching relay 37 when switch 36 is in its upper position. Latching relay 37 is supplied with an indication of the position of antenna 24 as indicated by dotted line 38. Latching relay 37 is constructed so that either of two different synchronizing potentials is applied through switch 36 to gain shifter 35. The potential applied through switch 36 is changed with each closing of a switch operated once each revolution of antenna 24. Such latching relays are well known. Alternatively, a stepping relay might be used as component 37, each closing of the antenna operated switch stepping a wheel forward by one position, said wheel being arranged so that alternate positions apply one synchronizing potential to gain shifter 35 while intermediate positions apply the other potential. With switch 36 in its lower position, gain shifting circuit 35 receives from timer 20 controlling pulses synchronized with the PRF of the system. With switch 36 in the middle position, circuit 35 is a free running multivibrator.

Fig. 2 shows how a typical display might appear on screen 34 of cathode ray tube 31. It is termed three-tone presentation. In this case water return, as indicated by double-hatched area 40 appears dark; ground return, as indicated by single hatched area 41, appears gray; and echoes from prominent targets, as indicated by buildings 42 and bridge 43, appear as light spots.

Referring now more particularly to Fig. 3 for a description of the circuit of I.-F. amplifier 27 and gain shifter 35. Vacuum tube 50 is part of I.-F. stage in I.-F. amplifier 27. Resistor 51 connected in parallel with capacitor 52 to ground provides a bias on cathode 53 of tube 50. Grid 54 of tube 50 is connected in the conventional fashion through coupling capacitor 55 to the previous stage. Grid 54 is also connected through choke 56 of bypass condenser 57 to a pulse generator included in gain shifter 35.

Gain shifter 35 may include a multivibrator consisting of two vacuum tubes 62 and 63 having their cathodes 64 and 65, respectively, connected to a source of negative potential, —E. Anode 66 of tube 62 is connected to ground through load resistors 68 and 70. Anode 67 of tube 63 is connected to ground through load resistor 69. Control grids 72 and 73 of tubes 62 and 63, respectively, are connected to the negative potential, —E, through variable grid resistors 74 and 75, respectively. Resistors 74 and 75 are arranged for ganged operation so that when one increases in resistance the other decreases in resistance. Control grid 72 is connected through capacitor 76 to anode 67. Control grid 73 is connected through capacitor 77 to anode 66. Control grid 73 is also connected to terminal 78, the purpose of which will be explained later.

In explaining the operation of the system shown in Fig. 1, transmitter 21 under control of timer 20 feeds short radio frequency pulses to T-R box 22 to antenna 24. Reflected pulses are received by antenna 24 and fed back to T-R box 22, converter 26, I.-F. amplifier 27, detector 28 and video amplifier 29 to control grid 30 of display tube 31 where a visible indication of the reflecting object is produced on screen 34. T-R box 22 operates to prevent transmitted pulses from transmitter 21 from entering converter 26 and also to prevent received pulses from antenna 24 from entering transmitter 21.

With switch 36 in its upper position, gain shifter 35 causes the gain of I.-F. amplifier 27 to be relatively high over alternate azimuthal rotation of antenna 24 and relatively low during the intermediate rotations.

With switch 36 in its lower position, gain shifter 35 causes I.-F. amplifier 27 to have relatively high gain during the interval between two transmitted search pulses and relatively low during the next interval.

Tubes 62 and 63 shown in Fig. 3 constitute a multivibrator the operation of which is described on page 512, Radio Engineer's Handbook by Terman, published by McGraw-Hill Book Company 1943. As a result of the arrangement of the grid resistors 74 and 75, the natural frequency of the multivibrator will remain unchanged. However, varying the values of resistors 74 and 75 will determine the portion of the entire cycle during which tube 62 conducts. In conducting, tube 62 draws plate current through load resistors 68 and 70 making the center tap point of potentiometer 70 negative with respect to ground and hence negative with respect to cathode 53 of tube 50. This negative voltage is applied through choke 56 to control grid 54 and increases the negative grid to cathode bias of vacuum tube 50 by an amount dependent upon the setting of potentiometer 70. The gain of vacuum tube 50 is thus lower when 66 is conducting than it is when 66 is non-conducting.

Figure 5:
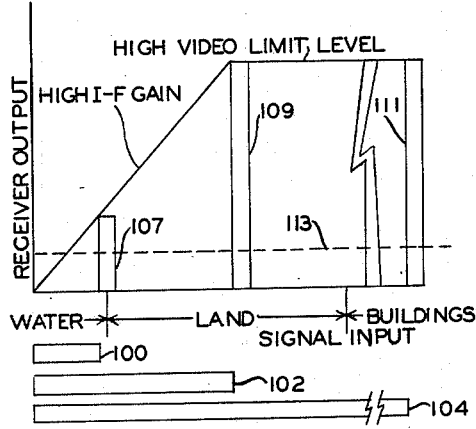

Referring to the graphs for a further explanation of the operation of the system shown in Fig. 1, Fig. 4 shows the receiver output vs. input during the period of low I.-F. gain and high video limit level. Fig. 5 shows the receiver output vs. input during the period of high I.-F. gain and the same high video limit level. In Figs. 4 and 5, signal 100 represents a typical signal reflected from a body of water. Signal 102 represents a signal reflected from a land mass and signal 104 represents a reflection from a building. Signal 104 is represented as a broken bar since its magnitude relative to the other signals is too great to be truly represented. Then for the low-gain period, the output of the receiver for these three signals will be signals 101, 103, and 105, respectively as shown in Fig. 4. In the high-gain period, for the same input signals, the outputs will be signals 107, 109, and 111, respectively as shown in Fig. 5. Signals 105, 109, and 111 are at the video limit level of the receiver channel. The cathode ray tube threshold of illumination is shown by line 113 for comparison purposes.

The apparent intensity of any single reflected signal traces on the display screen of a cathode ray tube depends upon the average magnitude of each individual input of that signal which will intensify the display screen and also on the persistency of the screen. When the gain of the signal inputs to the tube is changed periodically from high to low-gain, then the apparent intensity of a particular signal trace on the display screen will depend to a great extent upon the ratio of the time durations of the high and low-gain periods as well as the amount by which the gain is shifted. Regardless of the duration of the low-gain period, the low-level signals 101 and 103 of Fig. 4 have contributed nothing to the overall intensity since they do not intensify the tube to its threshold value.

Figure 6:
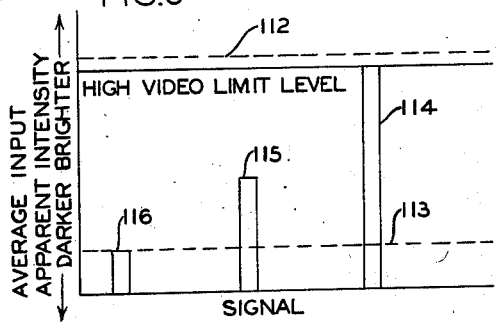

Referring to Fig. 6, the average relative input to the cathode ray tube, assuming the first and second gain shift periods are of equal duration, is plotted for the input signals designated above. Also shown is the relation between the magnitude of the inputs and the apparent intensity of the display screen of the cathode ray tube.

Signal 114 indicates the average relative gain of the building, signal 115 that of the ground, and signal 116 that of the body of water. The receiver video limit level, the cathode ray tube blooming level, 112, and the threshold of illumination, 113, are shown relative to those averages. For simplicity of explanation, it is assumed that the video limit level has been adjusted so as to prevent any signal from exceeding the blooming level. However, it should be understood that in the conventional receiver under ordinary circumstances this is not necessarily the case.

It will be seen that the system of Fig. 1 without requiring difficult manipulation of the gain control causes high intensity signals to be represented with maximum brightness on the cathode ray tube screen, while signals of much lower intensity are represented as traces of much lower intensity of the cathode ray tube screen. The normal gain control setting of the receiver channel is generally set so water echo will not produce a visible indication on the display screen. Land and water contours will thus be displayed along with distinguishable traces of prominent objects so that buildings and bridges can be seen in proper relation to the land and water contours surrounding them.

It will be obvious that the contrast of the display traces will be dependent upon the ratio of the time durations of the two gain shift periods as well as the value of the high I.-F. gain and the value of the low I.-F. gain. The contrast may thus be varied by controlling the ratio of time durations of the high and low gain periods. The adjustment of resistors 74 and 75 thus acts as a contrast adjustment while the adjustment on potentiometer 70 acts as a gain control during the shifted low gain period of the receiving channel. Normal gain of the receiver channel is regulated in the usual fashion with a separate gain control.

Figure 7:
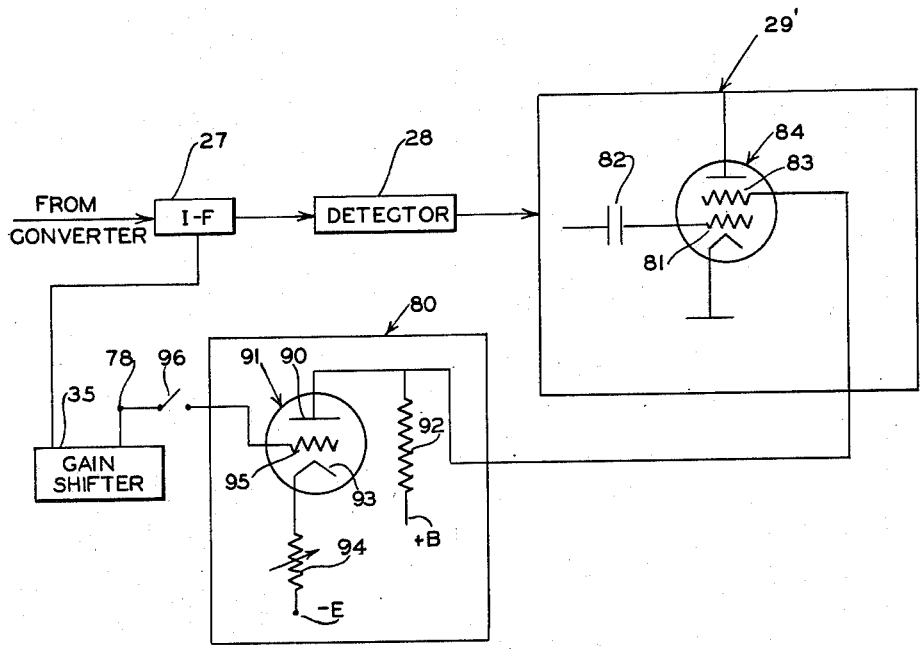
Fig. 7 is a block diagram of part of an alternative embodiment of a system embodying the principles of this invention.

Referring now to Fig. 7 for a description of an alternative embodiment of this invention, there is shown an alternative arrangement of I.-F. amplifier 27, detector 28, a modified video amplifier 29, in conjunction with gain shifter 35 and a limit shifter 80. In the alternative embodiment I.-F. amplifier 27, detector 28 and video amplifier 29 and gain shifter 35 are to be connected in the system of Fig. 1 except as explained below. The cooperation between these components and the other components of Fig. 1 is as explained above.

In video amplifier 29′ a part of one stage is shown in which the control grid 81 of tube 84 is connected through capacitor 82 to the preceding stage. Screen grid 83 of tube 84 is connected to anode 90 of tube 91 in limit shifter 80. Anode 90 is also connected through load resistor 92 to a source of plus potential. The cathode 93 of tube 91 is connected through variable resistor 94 to a source of negative potential —E. Control grid 95 of tube 91 is connected through switch 96 to terminal 78 of gain shifter 35 as seen in Fig. 3.

Referring to Fig. 7 for an explanation of the operation of the embodiment shown therein, I.-F. amplifier 27, detector 28 and gain shifter 35 operate in the same manner explained above in regard to the system shown in Fig. 1. In the embodiment of Fig. 7, however, limit shifter 80 operates to shift the limit level of video amplifier 29′ between an upper and a lower limit level. During the period in which tube 62 is conducting, tube 63 was cut off. Tube 91 is also cut off when switch 96 is closed as its grid is connected to grid 73 of tube 63. The plate voltage of tube 91 therefore equals the B+ potential source. This voltage is applied to screen grid 83 of tube 84. This causes a change in the video limit level of amplifier 29′. Actually the shifting of the voltage applied to screen grid 83 causes the video signals passing through tube 84 to be placed at intervals upon a pedestal. The pedestal is, however, lost in later stages due to their inability to amplify the low frequencies involved. It thus appears that during a first period when gain shifter 35 causes the gain of I.-F. amplifier 27 to be low, limit shifter 80 causes the limit level of amplifier 29′ to be at a high level. Then, between said intervals, or during a second period, gain shifter 35 causes the gain of I.-F. amplifier 27 to be high while limit shifter 80 causes the limit level of video amplifier 29′ to be at a low level.

Figure 8:
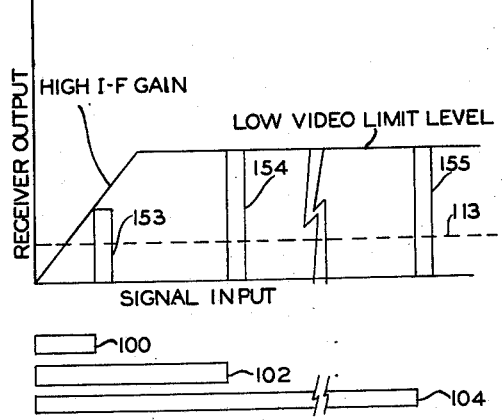
Figs. 8 and 9 are graphs of receiver characteristics used in the explanation of the embodiment of Fig. 7.

Again referring to the graphs for a further explanation of the operation of the embodiment of Fig. 7, Fig. 4, described in connection with the system of Fig. 1, shows the receiver characteristics during the first period of low I.-F. gain and high video limit level. Fig. 8 shows the receiver output vs. input during the second period of high I.-F. gain and low video limit level. The same input signals 100, 102, and 104 represent echo signals from water, land, and buildings, respectively. Signal 104 is again represented as a broken bar. Then for the first period, as in the first case, the output of the receiver for these three signals will be signals 101, 103, and 105, respectively as shown in Fig. 4. In the second period for the same input signals, the outputs will be signals 153, 154, and 155, respectively as shown in Fig. 8. Signals 154 and 155 are at the low video limit level of the receiver channel. The cathode ray tube threshold of illumination is shown by line 113 for comparison purposes.

Figure 9:
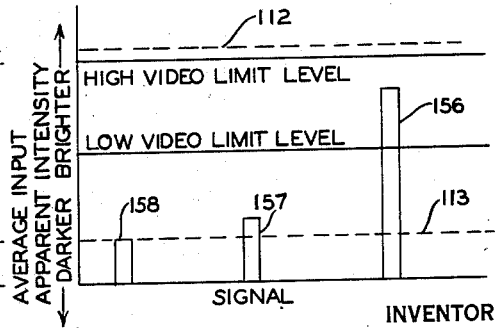

Referring to Fig. 9, the average relative inputs to the cathode ray tube, again assuming that the first and second periods are of equal duration, is plotted for the three input signals designated above. Also shown is the relation between the magnitude of the inputs and the apparent intensity of the display screen of the cathode ray tube. Signal 156 indicates the average relative intensity of the building echo, signal 157 that of the ground echo, and signal 158 that echo from a body of water. The receiver video limit levels, the cathode ray tube blooming level, 112, and the threshold of illumination, 113 are shown relative to those signal inputs.

It will be seen from Fig. 9 that the building echo signal 156 must be between the high video limit level and the low video limit level while the land echo signal 157 must be between the threshold value 113 and the low video limit level.

The apparatus of Fig. 7 is particularly advantageous in that it allows a greater degree of control of the contrast. The three classes of signals have been altered to fit within the useful range of the cathode ray tube. In addition it has separated the three classes of signals into three distinct groups, the contrast between the three being dependent upon the ratio of time durations between the two periods, the setting of the normal gain control, the setting of the low gain control, and the two video limit levels. Moreover during the period of high gain and low limit level the land echo indications are not placed on the display screen with as high intensity as the building echo indications during the period of high gain. Therefore, although the azimuthal rotation cycle be long and the persistance of the screen be short, there tends to be satisfactory contrast and better control of contrast between building and land echo indications.

It should be obvious to those skilled in the art that other means for shifting the gain of a vacuum tube, such as by controlling the cathode bias or plate voltage, could be used in this apparatus. In addition, control of the tube characteristic shift is not confined to the operation of a multivibrator. Especially in the case of a rapid azimuth scan radio object detection system, any electrical mechanical device for synchronizing the shifting of the characteristics with alternate azimuth scanning cycles may be used. Where the multivibrator is used it may be either free running, synchronized with the pulse repetition frequency or with the azimuthal scanning cycle of the radio object detection system. While the invention has been described in connection with the PPI type of display, its use is not limited to this method of display.

It will also be obvious that the use of this invention is not restricted to use with radio object detection apparatus but may be advantageous in any apparatus producing a visible indication.

While there has been described what is at present considered to be the preferred embodiment of this invention, it will be obvious to those skilled in the art that various changes and modifications may be made therein without departing from the scope of the invention as set forth in the appended claims.

The invention claimed is:

1. In a radiant energy object detection system having an antenna rotatable with a given azimuthal scan frequency, apparatus for controlling and improving the contrast in the presentation of radio object detection echoes, comprising a radio signal receiver, means coupled to said receiver for displaying said echoes, means connected to said receiver for periodically switching between two values above zero the sensitivity of said receiver to provide alternate high and low sensitivity periods, means responsive to said antenna azimuthal scan frequency and connected to said periodic switching means for rendering the duration of each of said periods equal to the duration of one scan cycle.

2. In a radiant energy object detection system having an antenna rotatable to provide a given azimuthal scan frequency, apparatus for controlling and improving the contrast in the presentation of radio object detection echoes, comprising a radio signal reciever, an output signal amplified coupled to said receiver, said amplifier having a given operative signal threshold level, means for displaying said echoes connected to said amplifier, first means for switching said threshold signal level of said amplifier coupled thereto to provide periodically high and low output signal levels, second means connected to said receiver for simultaneously switching between two values above zero the sensitivity thereof so that during periods of low amplifier output signal level there is high receiver sensitivity and during periods of high amplifier output signal level there is low receiver sensitivity, means responsive to said azimuthal scan frequency and connected to said first and said second periodic switching means for controlling said first and second periodic switching means so that there is high receiver sensitivity simultaneous with low output signal level of said amplifier during alternate rotational cycles of said antenna and low receiver sensitivity simultaneous with high output signal level of said amplifier during the intermediate rotational cycles of said antenna.

3. A radiant energy responsive system for improving and controlling the contrast in the presentation of received radio signals, comprising a radio signal receiver, a device to be energized by said receiver for effecting a presentation of the received signals, means connected to said receiver for translating the signals of said receiver to said device, said means having a given operating signal threshold level, first means for periodically switching the threshold level of said translating means between high and low output signal levels respectively, second means synchronized with said first means for simultaneously switching the sensitivity of the receiver between low and high sensitivity respectively, periods of high signal level and low receiver sensitivity occurring coincidentally in time, and periods of low signal level and high receiver sensitivity occurring coincidentally in time.

4. In a radiant energy detection system having a given transmission pulse repetition frequency, apparatus for controlling and improving the contrast in the presentation of radio object detection echoes, comprising a radio signal receiver, an output signal amplifier coupled to said receiver, said amplifier having a given operative signal threshold level, means connected to said amplifier for displaying said echoes, first means for periodically switching the threshold signal level of said amplifier between high and low output signal levels respectively, second means synchronized with said first means and connected to said receiver for simultaneously switching the sensitivity thereof between low and high values above zero respectively, periods of low amplifier output signal level occurring coincidentally in time with high receiver sensitivity, and periods of high amplifier output signal level occurring coincidentally in time with low receiver sensitivity, means responsive to said pulse repetition frequency and connected to said first and second switching means for rendering the duration of said periods equal to the duration of a pulse repetition cycle.

RUBBY SHERR.

References Cited in the file of this patent

UNITED STATES PATENTS

| Number | Name | Date |
|---|---|---|
| 1,960,723 | Beers | May 29, 1934 |
| 2,149,697 | Holst et al. | Mar. 7, 1939 |
| 2,233,275 | Wolff | Feb. 25, 1941 |
| 2,303,358 | Hoover | Dec. 1, 1942 |
| 2,403,562 | Smith | July 9, 1946 |
| 2,406,316 | Blumlein | Aug. 27, 1946 |
| 2,426,182 | De Lange | Aug. 26, 1947 |
| 2,435,960 | Fyler | Feb. 17, 1948 |
| 2,449,985 | Gloess | Sept. 28, 1948 |
| 2,471,516 | Bryant | May 31, 1949 |
| 2,492,120 | Smith | Dec. 20, 1949 |
| 2,498,381 | Smith | Feb. 21, 1950 |

FOREIGN PATENTS

| Number | Country | Date |
|---|---|---|
| 113,233 | Australia | June 2, 1941 |